Figure 4:
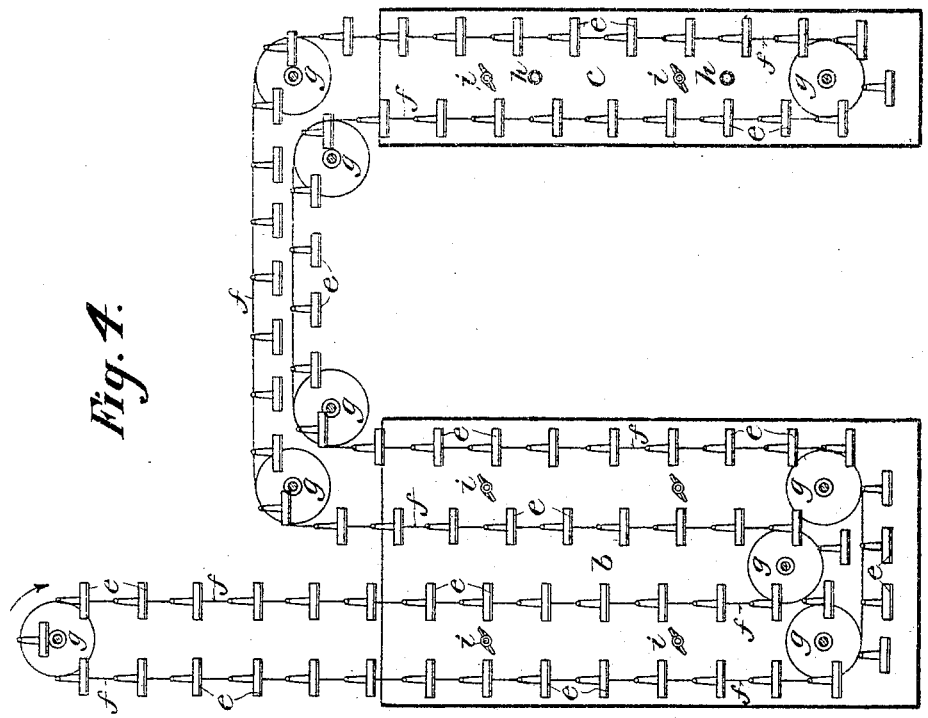

No. 764,657. PATENTED JULY 12, 1904.
W. CLASMANN.
PASTEURIZING APPARATUS.
APPLICATION FILED APR. 25, 1902.
NO MODEL. 3 SHEETS—SHEET 1.
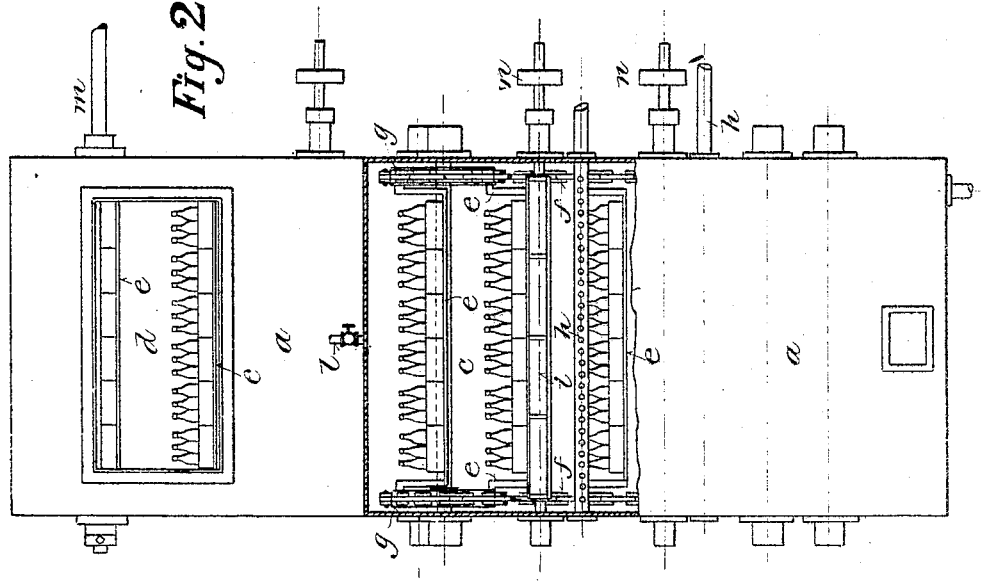
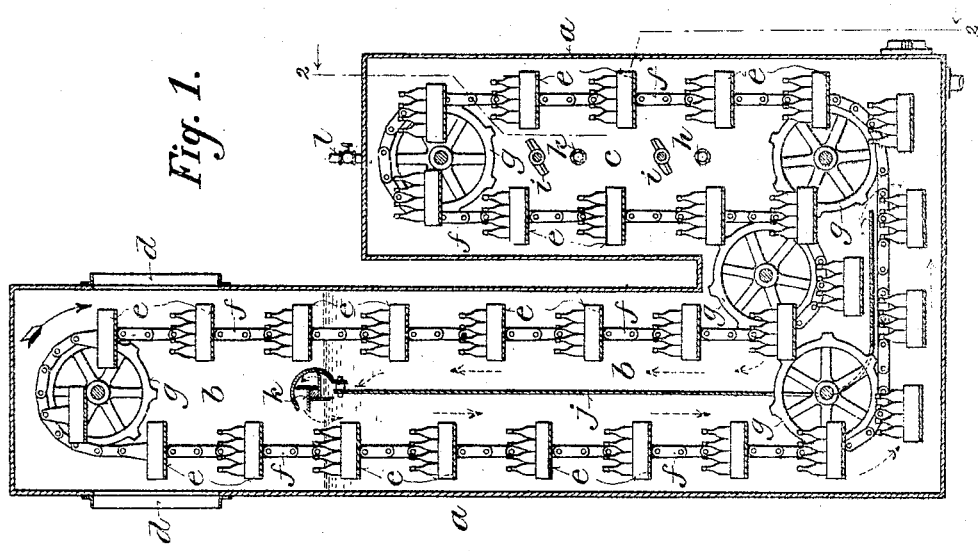
Witnesses:
Inventor:
William Clasmann No. 764,657. PATENTED JULY 12, 1904.
W. CLASMANN.
PASTEURIZING APPARATUS.
APPLICATION FILED APR. 25, 1902.
NO MODEL. 3 SHEETS—SHEET 2.

Witnesses:
Chas. L. Goss.
Alice E. Goss.

Inventor:
William Clasmann,
By Wuchler Flanders Smith Bottum &Wy,
Attorneys.

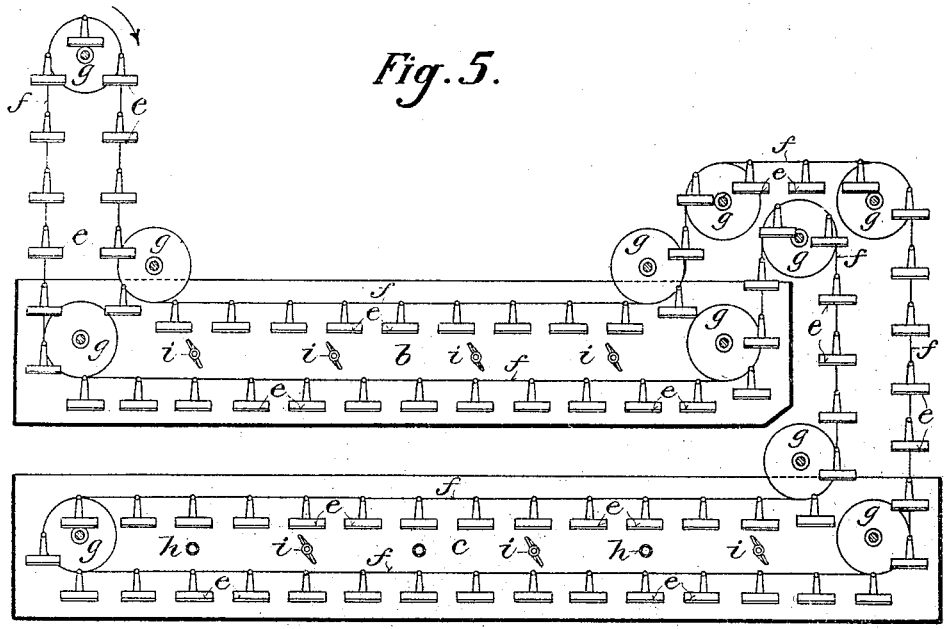

No. 764,657.

Patented July 12, 1904.

UNITED STATES PATENT OFFICE.

WILLIAM CLASMANN, OF MILWAUKEE, WISCONSIN, ASSIGNOR TO PABST BREWING COMPANY, OF MILWAUKEE, WISCONSIN, A CORPORATION OF WISCONSIN.

PASTEURIZING APPARATUS.

SPECIFICATION forming part of Letters Patent No. 764,657, dated July 12, 1904.

Application filed April 25, 1902. Serial No. 104,611. (No model.)

*To all whom it may concern:*

Be it known that I, WILLIAM CLASMANN, a citizen of the United States, residing at Milwaukee, in the county of Milwaukee and State of Wisconsin, have invented certain new and useful Improvements in Pasteurizing Apparatus, of which the following is a specification, reference being had to the accompanying drawings, forming a part thereof.

This invention relates particularly to apparatus for pasteurizing or sterilizing bottled beer and other products, beverages, food, or perishable substances contained in sealed or closed receptacles—such as bottles, cans, jars, and the like.

The main objects of the invention are to gradually heat the beer or other material to be treated to a pasteurizing temperature, to hold it at that temperature for a certain time and then gradually cool it, to save heat, to avoid waste of water, to economize space, and generally to improve the construction and operation of apparatus of the class to which the invention relates.

It consists in certain novel features in construction and in the arrangement and combinations of parts hereinafter particularly described, and pointed out in the claims.

In the accompanying drawings like letters designate the same parts in the several figures.

Figure 1 is a vertical section of one form of apparatus embodying the invention. Fig. 2 is an elevation and partial section on the line 2 2, Fig. 1, of the apparatus shown in Fig. 1 as viewed from the right with reference to Fig. 1; and Figs. 3, 4, and 5 are sectional views corresponding with Fig. 1 of modified forms of the apparatus.

Referring to Figs. 1 and 2, $a$ is a tank or receptacle adapted to hold water or other liquid for conveying and distributing heat to and from the bottled beer or other material to be treated in the apparatus, as hereinafter explained. This tank or receptacle has two vertically-disposed compartments $b$ and $c$, which communicate with each other at their lower ends. The compartment $b$, which may be called the "warming" and "cooling" compartment, extends above the compartment $c$ and is provided with one or more openings $d$ for placing the material to be treated in and removing it from the apparatus. The compartment $c$, which may be called the "heating" or "sterilizing" compartment, is closed at the top. An endless conveyer, consisting of trays or holders $e$, suspended at the ends from chains or link belts $f$, which are carried and guided by suitably-arranged sprocket-wheels $g$, is adapted to carry the material to be treated downward through the compartment $b$, thence upward and downward through the compartment $c$, thence back and upward through the compartment $b$, opposite parts of the conveyer traveling simultaneously in opposite directions through each of said compartments. The heating-compartment $c$ is provided with perforated steam-pipes $h$ for heating the liquid therein and with rotary agitators $i$ for producing or accelerating circulation of said liquid and more evenly distributing the heat conveyed thereby to the material carried by oppositely-moving parts of the conveyer. As shown in Fig. 1, the compartment $b$ may be provided with a vertical partition $j$ between the descending and ascending parts of the conveyer. At the top of this partition, which terminates at or near the desired liquid-level, a paddle-wheel $k$ or other suitable device is provided to transfer water from one side of said partition to the other and produce a current, as indicated by dotted arrows, in a direction opposed to the travel of the conveyer. The heating-compartment $c$ is provided at the top with a valve-controlled vent and air-supply connection $l$, by means of which air entrapped in the upper part of said compartment may be released, so that the compartment will fill with water or other liquid or by means of which air may be forced into said compartment to displace more or less of the water or other liquid in the upper part thereof. In this way by varying the depth of the water or other liquid in the heating-compartment $c$ the material to be treated therein may be subjected to a pasteurizing temperature a longer or shorter time for any given speed of the conveyer, while the time for warming and cooling the material in the compartment b remains the same. The conveyer may be driven by power applied to the shaft m of the sprocket-wheels in the upper end of the compartment b or to any other convenient part of the machine, and the agitators i may be driven by means of pulleys n on the agitator-shafts which project through the stuffing-boxes in the tank a, as shown in Fig. 2.

Figure 3:
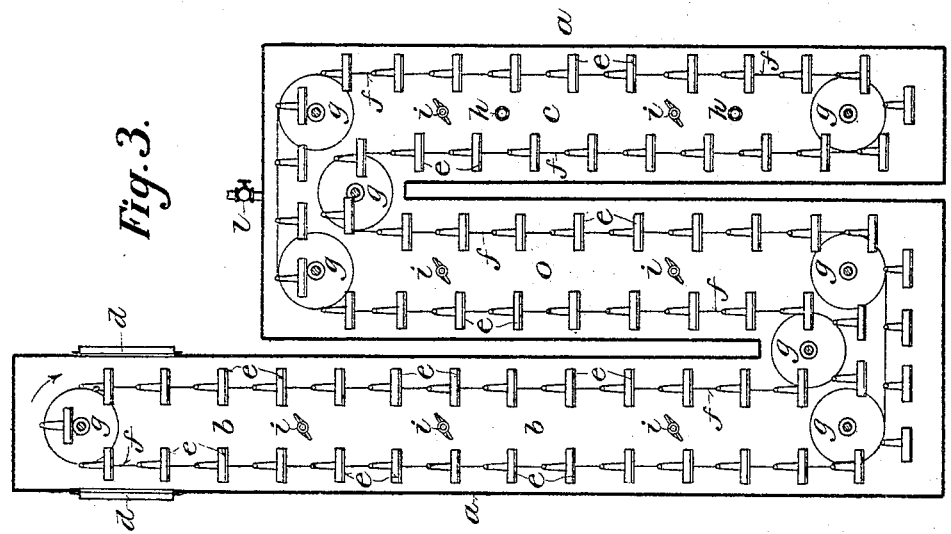

Referring to Fig. 3, showing a modification of the apparatus, the tank a has an extra or third compartment o between the compartments b and c. This compartment o communicates at its upper end with the upper end of the heating-compartment c and at its lower end with the lower end of the compartment b, constituting, in effect, an extension of the warming and cooling compartments. In this form of the apparatus the partition in compartment b is omitted and agitators i are provided to produce or accelerate circulation of the liquid and distribute the heat. The compartment o is or may be also provided with agitators. In other respects the apparatus is like that shown in Figs. 1 and 2.

Referring to Fig. 4, the warming and cooling and the heating or pasteurizing compartments b and c are entirely separate from each other and are open at the top, the conveyer passing over suitably-located sprocket-wheels from the top of one to the top of the other. The compartment or tank b is in this case made larger horizontally to accommodate the two extra runs of the conveyer, but is not as high as it is shown in Figs. 1 and 3. In other respects the apparatus is essentially like that shown in the preceding figures.

Referring to Fig. 5, the warming and cooling and the heating compartments b and c are, as in Fig. 4, entirely separate from each other and are open at the top, but in this case they are arranged horizontally instead of vertically, and the sprocket-wheels by which the conveyer chains or belts are guided are arranged to carry the trays or holders e horizontally in opposite directions through the liquid in each of said compartments.

In the operation of each of the several forms of apparatus herein shown and described it will be apparent that the heat given off by the outgoing material is taken up by the liquid and transferred to the cool incoming material, the temperature of which is thereby gradually raised by heat which would otherwise be lost. The cool incoming material absorbing heat from the liquid through which the outgoing material passes cools the outgoing material to the desired temperature. The material being carried by the conveyer through the heating compartment or tank in opposite directions tends to distribute the heat and to maintain an approximately uniform temperature therein, the temperature being governed and regulated by the admission of more or less steam into said compartment through the pipes h. The proper distribution and application of the heat to gradually raise the incoming material to a pasteurizing temperature, to maintain it for a certain period at that temperature and then gradually cool it, is most advantageously effected without loss either of heat or of water or other liquid by the counter-currents produced by oppositely-moving portions of the conveyer in the several compartments of the apparatus, aided if necessary or desired by the agitators i, the paddle-wheel k, as shown in Fig. 1, or other means.

The gradual change effected by my improved apparatus in the temperature of the material as it is heated to and cooled from a pasteurizing temperature avoids to a great extent the breaking of bottles or other fragile receptacles and consequent loss resulting from too abrupt change of temperature.

It will be observed that the apparatus may be arranged so as to occupy little available floor-space. For instance, with the forms shown in Figs. 1, 2, and 3 only the upper end of the compartment b need extend above the working floor, and with the forms shown in Figs. 4 and 5 only that portion of the conveyer passing over the upper sprocket-wheels from and into the warming and cooling compartment or tank b need extend above the working floor.

Various changes in details of construction and arrangement of parts may be made within the spirit and intended scope of the invention.

I claim—

1. In pasteurizing apparatus the combination of a heating-receptacle adapted to contain a liquid, means for heating the liquid contained in said receptacle, a warming and cooling receptacle also adapted to contain a liquid, and an endless conveyer arranged to travel through the liquid contained in said warming and cooling receptacle, thence through said heating-receptacle and thence back through the liquid in said warming and cooling receptacle in an opposite direction, whereby heat is transferred by the liquid from the outgoing to the ingoing material carried by said conveyer, the ingoing material is gradually heated and the outgoing material is gradually cooled, substantially as described.

2. In pasteurizing apparatus the combination of a heating-receptacle, a receiving and delivering receptacle divided into warming and cooling compartments, an endless conveyer arranged to travel through said warming-compartment, thence through said heating-receptacle and thence through said cooling-compartment, and means for heating the liquid in said heating-receptacle, substantially as described.

3. In pasteurizing apparatus the combination of a heating-receptacle, a receiving and delivering receptacle divided into warming and cooling compartments, an endless conveyer arranged to travel through said warming-compartment, thence through said heating-receptacle and thence through said cooling-compartment, means for heating the liquid in said heating-receptacle, and means for producing a circulation of the liquid through the warming and cooling compartments in a direction opposite to the travel of the conveyer, substantially as described.

4. In pasteurizing apparatus the combination of a vertically-disposed closed heating-tank adapted to contain a liquid, a vertically-disposed warming and cooling receptacle provided above said heating-tank with a feed and discharge opening and communicating below said opening with said heating-tank, and an endless conveyer arranged to travel in opposite directions through said warming and cooling receptacle and through said heating-tank, and means for heating the liquid in the heating-tank, substantially as described.

5. In pasteurizing apparatus the combination of a receptacle, having a warming and cooling compartment adapted to contain a liquid and a pasteurizing-compartment communicating with the warming and cooling compartment and also adapted to contain a liquid, means for heating the liquid in said pasteurizing-compartment, and an endless conveyer arranged to travel through the liquid contained in said warming and cooling compartment, thence through said pasteurizing-compartment and thence back through the liquid in said warming and cooling compartment in an opposite direction, substantially as described.

6. In a pasteurizing apparatus the combination of a warming and cooling tank, adapted to contain a liquid, a pasteurizing-tank also adapted to contain a liquid, means for heating the liquid of said pasteurizing-tank, and a conveyer arranged to carry the article to be pasteurized through the liquid of said warming and cooling tank, thence through the liquid of said pasteurizing-tank, thence back through the liquid of said warming and cooling tank.

In witness whereof I hereto affix my signature in presence of two witnesses.

WILLIAM CLASMANN.

Witnesses:
 CHAS. L. GOSS,
 ALICE E. GOSS.